(12) United States Patent
Nakatsuyama

(10) Patent No.: US 6,870,907 B1
(45) Date of Patent: Mar. 22, 2005

(54) DATA DISTRIBUTION SYSTEM, DISTRIBUTION EQUIPMENT, TERMINAL EQUIPMENT AND DATA DISTRIBUTION METHOD

(75) Inventor: Takashi Nakatsuyama, Chiba (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/170,724

(22) Filed: Oct. 14, 1998

(30) Foreign Application Priority Data

Oct. 17, 1997 (JP) .......................................... P9-285450

(51) Int. Cl.[7] .......................................... H04M 11/00
(52) U.S. Cl. .......................... 379/88.14; 379/101.01; 375/240.26; 370/468; 345/717
(58) Field of Search .................. 379/88.14, 101.01, 379/67.1; 375/240.26, 220, 240; 386/98, 126; 381/4; 345/717; 341/50, 107; 370/468, 437; 725/101, 100, 91, 93, 114, 116, 117, 131, 139, 151, 89; 348/714, 738, 483, 485; 369/93; 704/200.1

(56) References Cited

U.S. PATENT DOCUMENTS

| | | | |
|---|---|---|---|
| 4,684,981 A | * | 8/1987 | Toyoshima et al. .......... 725/151 |
| 4,953,021 A | * | 8/1990 | Ishikawa et al. ............. 348/485 |
| 4,967,196 A | * | 10/1990 | Sprague et al. |
| 5,132,992 A | * | 7/1992 | Yurt et al. ................... 375/240 |
| 5,222,143 A | * | 6/1993 | Min ............................. 381/4 |
| 5,469,474 A | * | 11/1995 | Kitabatake .................. 704/229 |
| 5,546,118 A | * | 8/1996 | Ido ............................. 348/714 |
| 5,592,511 A | * | 1/1997 | Schoen et al. .............. 375/220 |
| 5,664,056 A | * | 9/1997 | Akagiri ..................... 704/200.1 |
| 5,675,738 A |   | 10/1997 | Suzuki et al. |
| 5,731,767 A | * | 3/1998 | Tsutsui et al. ............... 341/50 |
| 5,734,657 A | * | 3/1998 | Kim .......................... 370/437 |
| 5,774,672 A | * | 6/1998 | Funahashi et al. .......... 725/138 |
| 5,895,124 A | * | 4/1999 | Tsuga et al. ................. 386/98 |
| 5,917,835 A | * | 6/1999 | Barrett et al. ................ 369/93 |
| 6,144,400 A | * | 11/2000 | Ebisawa ..................... 725/101 |
| 6,191,822 B1 | * | 2/2001 | Smyers ....................... 386/98 |
| 6,278,739 B2 | * | 8/2001 | Enomoto et al. ...... 375/240.26 |

FOREIGN PATENT DOCUMENTS

WO    WO96/3105    10/1996

* cited by examiner

*Primary Examiner*—Roland G. Foster
*Assistant Examiner*—Gerald Gauthier
(74) *Attorney, Agent, or Firm*—Jay H. Maioli

(57) ABSTRACT

In a data distribution system for distribution of music data from an information service center to remote user terminal equipment, the music data distributed to the user's terminal is divided into an outline data part representing an outline of the music data and a supplement data part recombinable with the outline part to restore the music data. The outline and supplement parts are time-division transmitted to the terminal equipment. Even if the terminal equipment receives data at a low transfer rate it can receive the outline part first and reproduce, for continuous monitoring, the music data being downloaded.

9 Claims, 6 Drawing Sheets

DATA DISTRIBUTION SYSTEM, DISTRIBUTION EQUIPMENT, TERMINAL EQUIPMENT AND DATA DISTRIBUTION METHOD

BACKGROUND OF THE INVENTION

1. Field of the Invention

The present invention relates to a data distribution system, distribution equipment, terminal equipment and a data distribution method, suitable for use in a data service system or the like for distribution of digital data, for example.

2. Description of Related Art

Recently, the video and audio data compression technology, and the digital signal processing technology in broadcasting and communication systems have shown remarkable innovations. In these situations, it has been proposed to organize between a user and server a data distribution system incorporating such advanced data compression technology and signal processing technology. Generally, the data distribution system is called "video on demand (VOD)" or "music on demand (MOD)" system and destined to distribute a digital data to a user getting access to the system. Such data distribution systems include a MOD system for data communication via an Internet system and a packet transmission system, for example.

In such a MOD system, however, the transfer rate is limited and a transmission being done is likely to be interrupted by any other one, which makes it difficult to transmit a digital data fluently with no congestion of the communication network over which the transmissions are made. When a music data, for example, is transferred over a data communications network from a server to a user in the conventional MOD system, the transfer rate of the communications network is very approximate, in many cases, to a data transfer rate required for reproduction of the audio data. In such a case, since the transfer rates are so approximate to each other that a continuity of the audio data cannot be assured downloading it into a hard disc or the like at the user's side (such a reproduction will be referred to as "real-time reproduction" hereinafter). Actually, there exists a problem that an audio data cannot be reproduced before the downloading is complete.

Further to the above, there is a case that a communications network, over which the MOD system transmits an audio data from a server to a user, has a maximum transfer rate of 28.8 kbps and a mean transfer rate of 22 kbps while the data transfer rate necessary for a real-time reproduction of the audio data is 32 kbps. In this case, since the data transfer rate required for real-time reproduction exceeds the transfer rate of the communications network, the received data cannot be real-time reproduced at the user's side.

SUMMARY OF THE INVENTION

Accordingly, the present invention seeks to overcome the above-mentioned drawbacks of the prior art by providing a data distribution system, data distribution equipment, data terminal equipment, and a data distribution method applied in the data distribution system.

The above object can be achieved by providing a data distribution system including an information service center and terminal equipment remote from the information service center and adapted to distribute an audio data from the information service center to the terminal equipment, the information service center comprising:
  means for storing a plurality of programs;
  means for retrieving a desired program selected at the terminal equipment from the plurality of programs stored in the storage means;
  means for dividing the desired program retrieved by the data retrieving means into an outline part so as to know the outline of the entire program and a supplement part combinable with the outline part to restore the initial program; and
  means for time-division transmission of the outline and supplement parts divided by the data dividing means; and the terminal equipment comprising:
  means for receiving the outline and supplement parts distributed from the information service center;
  means for recombining the outline and supplement parts received by the receiving means; and
  means for reproducing the initial program based on the outline part for monitoring.

The above object can also be achieved by providing an information service center for distributing a program to terminal equipment, comprising:
  means for storing a plurality of programs;
  means for retrieving a desired program selected at the terminal equipment from the plurality of programs stored in the storage means; and
  means for dividing the desired program retrieved by the data retrieving means into an outline part so as to know the outline of the entire program and a supplement part recombinable with the outline part to restore the initial program.

The above object can also be achieved by providing/ terminal equipment for receiving a program transmitted from an information service center, comprising:
  means for receiving a program outline part and supplement part distributed from the information service center;
  means for recombining the outline and supplement parts received by the receiving means; and
  means for reproducing the initial program based on the outline part for the purpose of monitoring.

The above object can also be achieved by providing a method of distributing a program between an information service center and terminal equipment remote from the information service center, comprising the steps of:
  dividing a desired program selected at the terminal equipment into an outline part so as to know the outline of the entire program and a supplement part recombinable with the outline part to restore the initial program;
  transmitting in a time-division manner the outline and supplement parts divided by the data dividing means to the terminal equipment;
  receiving the outline and supplement parts distributed from the information service center;
  recombining the outline and supplement parts received by the receiving means; and
  reproducing the initial program based on the outline part for the purpose of monitoring.

BRIEF DESCRIPTION OF THE DRAWINGS

These objects and other objects, features and advantages of the present intention will become more apparent from the following detailed description of the present invention when taken in conjunction with the accompanying drawings, of which.

DETAILED DESCRIPTION OF THE PREFERRED EMBODIMENTS

Figure 1:
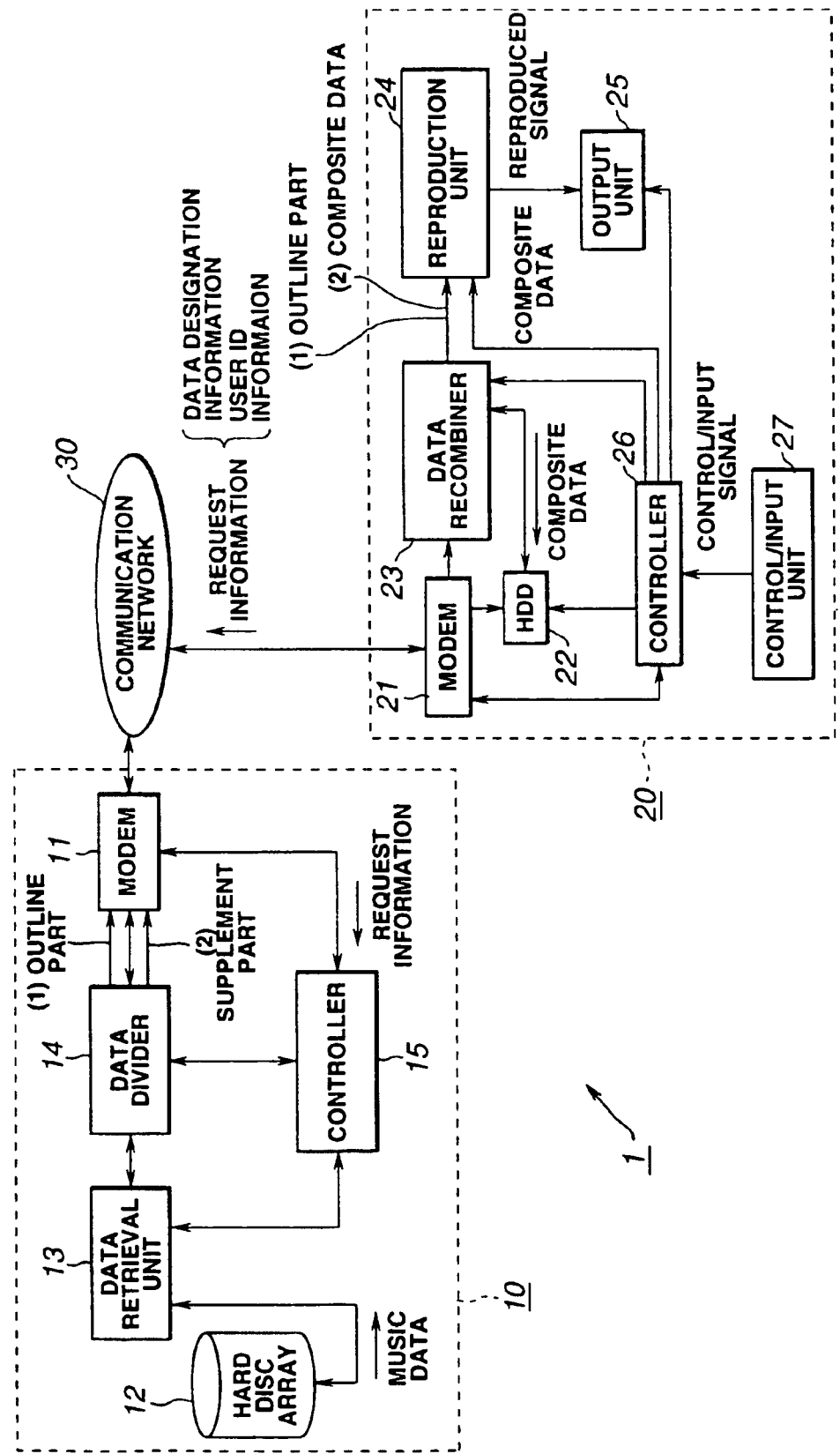
FIG. 1 is a block diagram of the data distribution system according to the present invention.

Referring now to FIG. 1, there is illustrated a data distribution system 1 which is a so-called a music on demand (MOD) system, comprising a data transmitter 10 which is terminal equipment at a server's side, and a data receiver 20 which is terminal equipment at the user's side. The data transmitter 10 and data receiver 20 are connected via a communications network 30 such as telephone line or the like. The data transmitter 10 is installed at a data control center, for example, at the server's side. The data receiver 20 is a household appliance for installation in each user's home. Note that only one data receiver 20 is shown in FIG. 1 for the simplicity of explanation. Actually, however, a plurality of such data receivers 20 will be connected to the data transmitter 10 at the server's side via the communications network 30.

The data transmitter 10 at the server's side is adapted to receive a request information sent from the data receiver 20 at the user's side via the communications network 30, retrieve a requested data based on the received request information, divide the retrieved data into an outline part and a supplement part, and transfer the divided outline and supplement parts in this order to the data receiver 20 via the communications network 30.

As will be seen from FIG. 1, the data transmitter 10 comprises a MODEM 11 connecting to the data receiver 20 at the user's side via the communications network 30 to effect data communications between the data transmitter 10 and data receiver 20, a large capacity hard disc array 12 having a plurality of data like music stored therein, a data retrieval unit 13 to retrieve the requested data from the hard disc array 12, a data divider 14 to divide the data retrieved by the data retrieval unit 13 into an outline data part and a supplement data part in a predetermined mode, and a controller 15 for controlling the whole data transmitter 10.

The MODEM 11 connects to the data receiver 20 via the communications network 30, receives the request information sent from the data receiver 20, and supplies the request information to the controller 15. Also the MODEM 11 transmits the outline and supplement parts, delivered from the data divider 14 which will be further described later, in this order to the data receiver 20. Note that each of the above functions of the MODEM 11 is performed under a control signal given from the controller 15.

The hard disc array 12 stores music data in various genres, data on music guide for retrieval of a desired music data, other audio data, etc. to serve a music on demand (MOD).

The data retrieval unit 13 receives via the controller 15 the request information sent from the data receiver 20 and received by the MODEM 11 and retrieves the requested data from among many data such as music stored in the hard disc array 12. The data retrieval unit 13 reads the requested data from the hard disc array 12 and delivers it to the data divider 14. Note that each of the above functions of the data retrieval unit 13 is performed under a control signal from the controller 15.

The data divider 14 divides the data supplied from the data retrieval unit 13 into an outline part and a supplement part in a preset mode. The data divider 14 is provided with a memory to temporarily store the data. Of the data parts divided as in the above, the outline part is first delivered to the MODEM 11 and the supplement part is stored into the memory once. Upon completion of the delivery of the outline part to the MODEM 11, the data divider 14 will read the supplement part once stored in the memory and then deliver it to the MODEM 11. Note that each of the above functions of the data divider 14 is performed under a control signal from the controller 15.

According to the present invention, the data divider may be adapted to divide a music data into an outline part and a supplement part as will be described herebelow.

In a first embodiment of the present invention, the outline part may include an audio data on a left (L) channel plus a one on a right (R) channel, and the supplement part include an audio data on the L channel minus a one on the R channel.

In a second embodiment of the present invention, a music data may be modulated in frequency band for the outline part to be an even spectrum and the supplement part to be an odd spectrum. Note that each of the spectra may be weighted differently from the other.

In a third embodiment of the present invention, the outline part may be in the middle frequency band while the supplement part is in the low and high frequency bands. Alternatively, the outline part may be in the low frequency band while the supplement part be in the high frequency band.

In a fourth embodiment of the present invention, the outline part may be a vocal data while the supplement part may be an accompaniment data.

As mentioned above, the data division can be effected in various modes among which an appropriate one may be selected as necessary. Note that the ratio between the outline and supplement parts may not always be 1:1, namely, the ratio in data volume between the outline and supplement parts divided by the data divider 14 may not be fifty—fifty.

With a higher ratio in volume of the outline part to the supplement part, a higher data quality can be attained in the data reproduction at the data receiver 20. However, the outline part may not possibly be real-time reproduced depending upon the condition, congested or not, of the communications network 30, the relation of the communications network 30 with the MODEM 21 of the data receiver 20 or the like. On the contrary, the lower the ratio between the outline and supplement parts, the more smoothly the outline part can be real-time reproduced at the data receiver 20 while the quality of the reproduced audio data will be lower. Therefore, at the data transmitter 10, a data is to be divided into an outline part and a supplement part at a ratio determined with a tradeoff between the real-time reproduction and quality of reproduced data taken in consideration.

Now, in the first embodiment of the present invention, a compressed audio data is transferred from the data transmitter 10 being the terminal equipment at the user's side to the data receiver 20 being the terminal equipment at the server's side as will be described hereinbelow. To compress the data, the currently available methods of data compression including the ATRAC (Adapted Transform Acoustic Coding), Twin-VQ (Transform domain Weighted Interleave Vector Quantization), Real-Audio, MPEG (Moving Picture coding Experts Group) Layer 2, etc. can be used. The ATRAC method is employed in the embodiments of the present invention. The ATRAC method will be described below with reference to FIG. 2.

The audio compression circuit incorporates the SBC (SubBand Coding), ATC (Adaptive Transform Coding) and adaptive bit allocation techniques to attain a high efficiency of coding.

Figure 2:
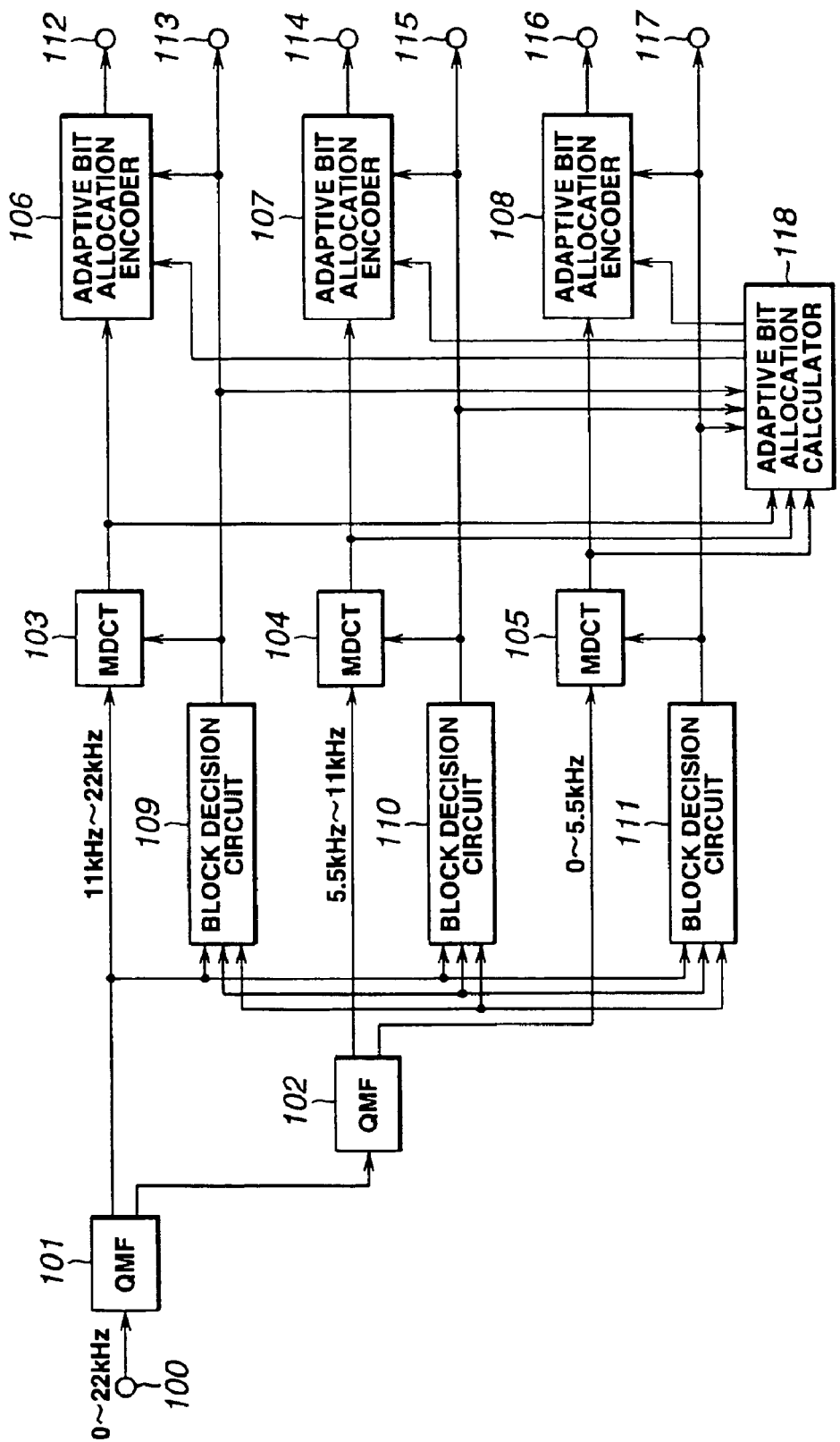
FIG. 2 is a block diagram of the high efficiency encoder according to the present invention.
Figure 3A:
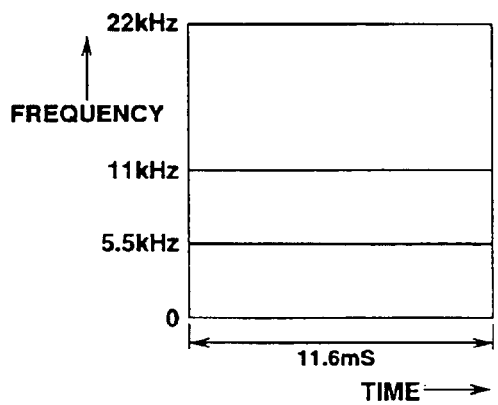
FIGS. 3A to 3D show each a relation between frequency and time of the modified discrete cosine transform (MDCT) block according to the present invention.
Figure 3B:
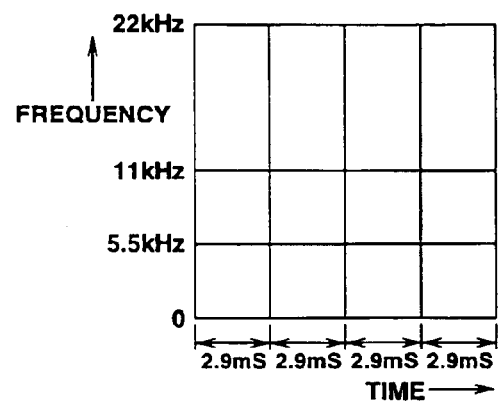
Figure 3C:
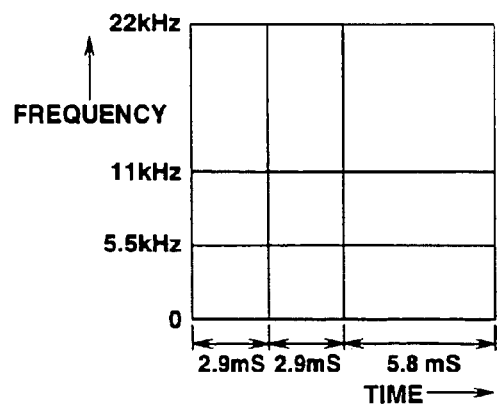
Figure 3D:
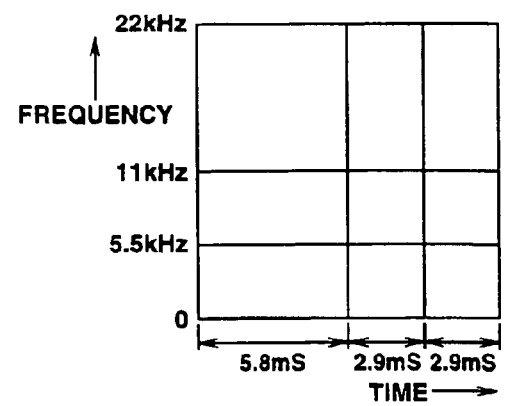

In the high efficiency encoder shown in FIG. 2, an input digital signal is divided into a plurality of frequency bands and the signal in each of the frequency bands is subjected to a discrete cosine transform to provide signal components for encoding and analysis in time and frequency band in a plurality of two-dimensional blocks. In a low frequency band, frequency-axial spectrum data thus obtained are encoded by an adaptive bit allocation for each of so-called critical bands in which the human auditory property which will be further described later are involved, and in middle and high frequency bands, the frequency-axial spectrum data encoding is done for each of band segments resulted from subdivision of the critical band in which the block floating efficiency is involved. Normally, the block will be a source of quantum noise. In the embodiment of the present invention, the block is adaptively changed in size (block length) corresponding to the input signal before subjected to the modified discrete cosine transform.

More particularly, as will be seen from FIG. 2, an audio signal of 0 to 22 kHz is sampled by 44.1 kHz and converted to a digital signal. The digital audio signal is subjected to a pulse code modulation. Thus an audio PCM signal is provided to an input terminal 100 of the high efficiency encoder. The input signal is divided by a subband filter 101 such as a so-called QMF (Quadrature Mirror Filter) into a signal in a band of 0 to 11 kHz and a signal in a band of 11 to 22 kHz. The signal in the band of 0 to 11 kHz is subdivided by a so-called QMF 102 into a signal in a band of 0 to 5.5 kHz, and a signal in a band of 5.5 to 11 kHz. The signal in the band of 5.5 to 11 kHz from the QMF 101 is passed to an MDCT (Modified Discrete Cosine Transform) circuit 103 being one type of discrete cosine transform circuits. The signal in the band of 11 to 22 kHz from the QMF 102 is passed to an MDCT circuit 104. The signal in the band of 5.5 to 11 kHz from the QMF 102 is passed to a MDCT 104 and the signal in the band of 0 to 5.5 kHz from the QMF 102 is passed to an MDCT 105. Thus, the signals are subjected to MDCT in the respective circuits. Note that in each of the MDCT circuits 103, 104 and 105, MDCT is done based on a block size (information compression parameter) determined by each of block decision circuits 109, 110 and 111, respectively.

An example of each band block supplied to each of the MDCT circuits 103, 104 and 105 is shown in each of FIGS. 3A to 3D. As seen from FIGS. 3A to 3D, each of the three filter output signals has a plurality of DCT block sizes (information compression parameter) independently in each band so that time resolution can be changed depending upon elapsed time, frequency distribution, etc. If the time is quasi-steady as the time passes, the DCT block size is increased by 11.6 ms, namely, as in a long mode in FIG. 3A. When the signal is non-steady, the DCT block size is subdivided by 2 and 4. As shown in a short mode in FIG. 3B, the DCT block size is divided by 4 alone and increased by 2.9 ms. Further as shown in a middle mode A in FIG. 3C and middle mode B in FIG. 3D, the DCT block size is partially divided by 2 and increased by 5.8 ms and by 4 and increased by 2.9 ms, respectively. Thus, an actual complex input signal can be supported by the high efficiency encoder. Further subdivision of the DCT block size will apparently be more effective if the capacity of the processor permits it.

The above block size (information compression parameter) is determined by each of the block decision circuits 109, 110 and 111 as in FIG. 2. The block sizes thus determined are transmitted to the MDCT circuits 103, 104 and 105 and to an adaptive bit allocation calculator circuit 118. Further, they are delivered as a block size information of the respective blocks at output terminals 113, 115 and 117.

Further description will be made below with reference to FIG. 2 again. In each of the frequency-axial spectrum data or MDCT coefficient data (signal component in a 2D block defined by time and frequency) obtained through MDCT in each of the MDCT circuits 103, 104 and 105, the data in the low frequency band is encoded in each so-called critical band while the data in the middle and high frequency bands are encoded in subbands of the critical band with the block floating effectiveness taken in consideration and supplied to adaptive bit allocation encoder circuits 106, 107 and 108 and bit allocation calculator circuit 118. Note that the critical band refers to a frequency subband in which the human auditory property is involved, namely, a narrow band having a noise which masks a pure tone of which the frequency is approximate to that in the band. The higher the critical band, the wider it is. The entire frequency band of 0 to 22 kHz is divided into 25 critical bands, for example.

The bit allocation calculator circuit 118 in FIG. 2 calculates a masking extent and an energy or peak value of each subband in which the critical band and block floating are involved, based on the above block size information, spectrum data or DCT coefficient data, namely, on the so-called masking effect. Based on the results of the calculation, the circuit 118 determines a number of allocated bits (bit allocation) for each of the subbands and supplies it to the adaptive bit allocation encoder circuits 106, 107 and 108 as shown in FIG. 2.

The adaptive bit allocation encoder circuits 106, 107 and 108 are adapted to re-quantize (quantize by normalizing) each spectrum data or MDCT coefficient data corresponding to the number bits allocated to each subband in which the block size information, critical band and block floating are involved. A data thus encoded is taken out via output terminals 112, 114 and 116 as shown in FIG. 2. Each subband in which the above critical band and block floating are involved, being a unit by which the bit allocation is done, will be called "unit block" in the following description.

The high efficiency compression encoder having been described in the foregoing with reference to FIG. 2 is provided in the data divider 14 in FIG. 1 to compress a digital audio signal transmitted from the data retrieval unit 13, deliver as the outline part a compressed data of the middle frequency band which will be delivered as a subband output at the adaptive bit allocation encoder circuit-14 in FIG. 2 and also deliver as the supplement part a compressed data of the low and high frequency bands which will be delivered at the adaptive bit allocation encoder circuits 112 and 116.

The controller 15 has a transmission control program under which a desired data such as music data is transmitted in a predetermined mode of data division to the data receiver 20 based on the request information sent from the data receiver 20 via the communications network 30. Also, the controller 15 controls the MODEM 11, data retrieval unit 13 and data divider 14 under the transmission control program.

More particularly, the controller 15 controls the MODEM 11 to receive a request information sent from the data receiver 20 via the communications network 30 and supply the received request information to the controller 15. The controller 15 will store once the request information supplied from the MODEM 11 and supplies it to the data retrieval unit 13. Note that the controller 15 may be adapted to extract from the request information only a data designation information and supply it to the data retrieval unit 13.

In addition, the controller 15 controls the data retrieval unit 13 to retrieve a data 4: based on the data designation information included in the request information, read a retrieved data from the hard disc array 12 and deliver it to the data divider 14.

Furthermore, the controller 15 controls the data divider 14 to divide the data supplied from the data retrieval unit 13 into the outline and supplement parts in a preset predetermined mode, deliver the divided outline part to the MODEM 11 while storing the divided supplement part into its memory. The controller 15 controls the MODEM 11 to transmit the divided outline part supplied from the data divider 14 to the data receiver 20 referring to a user ID information included in the request information, which will be described later. Furthermore, the controllers 15 controls the data divider 14 and MODEM 11 to read, upon completion of the transmission of the outline part, the supplement part from the memory of the data divider 14 and transmit it to the data receiver 20. Thus in the data distribution system 1, the outline and supplement parts are transferred in this order from the data transmitter 10 to the data receiver 20.

On the other hand, the data receiver 20 sends a request information to the data transmitter 10 based on a request of the user, sequentially receives the outline and supplement parts transferred from the data transmitter 10 based on the request information, records and/or reproduces the outline part, combines the outline and supplement parts into one data (a composite data), and records and/or reproduces the composite data thus generated.

As shown in FIG. 1, the data receiver 20 comprises a MODEM 21 connecting to the data transmitter 10 via the communications network 30, a hard disc drive (HDD) 22 to store the outline part, supplement or composite data, a data recombiner 23 to recombine the outline and supplement parts, a reproduction unit 24 to subject an output data from the data recombiner 23 to a predetermined reproductive processing, an output unit 25 including a speaker, monitor, headphone jack, etc. (not illustrated), a controller 26 to control the entire data receiver 20, and a control/input unit 27 including a keyboard, mouse, etc. (not illustrated) to give a command to the controller 26.

The MODEM 21 connects to the data transmitter 10 via the communications network 30 and sends to the data transmitter 10 a request information supplied from the controller 26 and which will be further described later. The MODEM 21 receives sequentially the outline and supplement parts transferred from the data transmitter 10 based on the request information, and supplies the received data to the HDD 22 and data recombiner 23. Note that each of the above functions of the MODEM 21 is performed under a control signal given from the controller 26.

The HDD 22 includes a hard disc (not shown) provided to store an outline part, supplement part or composite data. The HDD 22 stores the outline or supplement part supplied from the MODEM 21. The HDD 22 also connects the data recombiner 23. It records a composite data supplied from the data recombiner 23 and which will be further described later, and reads and supplies the recorded composite data or the recorded outline or supplement part to the data recombiner 23. Note that each of the above functions of the HDD 22 is performed under a control signal given from the controller 26.

The data recombiner 23 corresponds to the data divider 14 in the data transmitter 10, and has a memory to store data once as in the data divider 14. Under control signals given from the controller 26, the data recombiner 23 processes the outline and supplement parts transferred from the data transmitter 10 via the MODEM 21 as will be described herebelow.

The data recombiner 23 stores into the memory the outline part supplied from the MODEM 21 and supplies it to the reproduction unit 24. When supplied with a supplement part from the MODEM 21, the data recombiner 23 will read the outline part stored in the memory, recombine it with the supplement part into one data (a composite data), and supply it to the reproduction unit 24. Note that for reproduction of any of the outline, supplement or composite data recorded in the hard disc in the HDD 22, the data recombiner 23 delivers them as they are to the reproduction unit 24.

Figure 4:
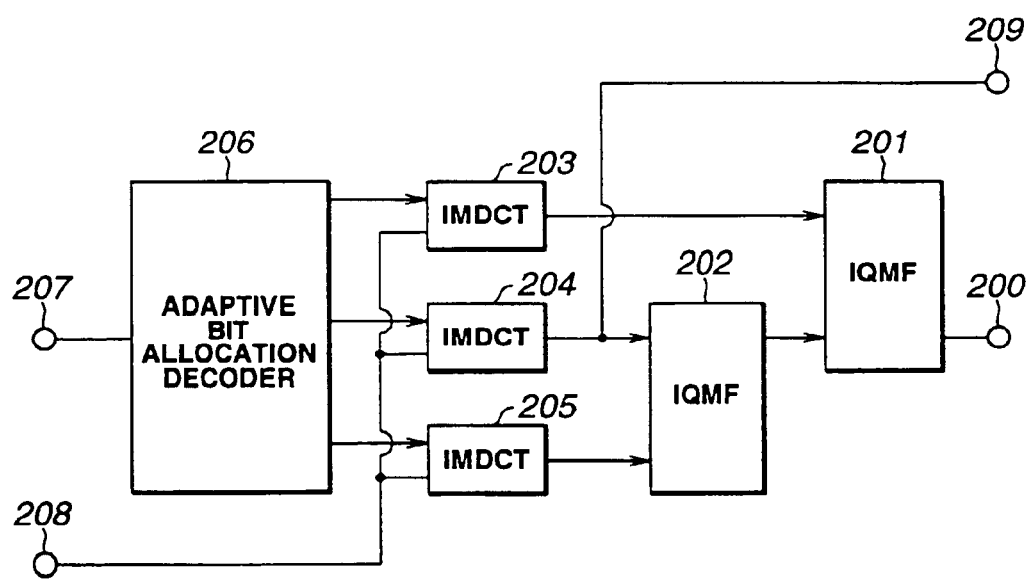
FIG. 4 is a block diagram of the high efficiency decoder according to the present invention.

FIG. 4 shows a detailed configuration of the data recombiner in FIG. 1. FIG. 4 shows a decoder circuit to decode a signal encoded by the high efficiency encoder shown in FIG. 2. The decoder is supplied at an input terminal 207 thereof with data equivalent to the output signals delivered at the output terminals 112, 114 and 116 shown in FIG. 2 and at an input terminal 208 with a data equivalent to the output signals delivered at the output terminals 113, 115 and 117. As shown in FIG. 4, the decoder comprises an adaptive bit allocation decoder circuit 206 which uses an adaptive bit allocation information to cancel a bit allocation. The decoder also comprises IMDCT circuits 203, 204 and 205 in which a frequency-axial signal is converted to a time-axial signal. The time-axial signals in the subbands are decoded by IQMF circuits 202 and 201 to a full-band signal. The signal recombined by the IQMF circuit is delivered at an output terminal. The signal delivered at the output terminal 200 corresponds to the composite data provided from the data recombiner 23 in FIG. 1.

The decoder delivers at an output 209 thereof the decoding result of a compressed data in the middle frequency band as an outline part. Namely, a signal delivered at the output terminal 209 corresponds to a composite data provided from the data recombiner 23 in FIG. 1.

The data recombiner in the first embodiment may be such adapted that the outline part is a sum of a data on the left (L) channel plus a one on the right (R) channel while the supplement part is a quotient of a data on the L channel minus a quotient on the R channel, the data recombiner 23 restores the data on the L (left) channel by dividing the sum of the outline part plus supplement part by two, and that on the R (right) channel by dividing the quotient of the outline part minus supplement part by two.

In the second embodiment of the present invention, the data recombiner 23 may be adapted to provide a composite data in which an even spectrum as the outline part and an odd spectrum as the supplement part are alternately arranged. Further, for reproduction of the outline data, an interpolation can be done using the even spectrum to generate the even spectrum which is provided as the outline data.

The third embodiment has been described in the above.

In the fourth embodiment of the present invention, the data recombiner 23 may be adapted to generate for delivery as the outline part an odd spectrum by interpolation with the even spectrum.

Furthermore, the data recombiner 23 may be adapted to recombine a vocal data as the outline part and an accompaniment data as the supplement part into one data.

The reproduction unit 24 is supplied with a control signal from the controller 26 to expand, D/A convert or amplify an outline or supplement part or composite data supplied from the data recombiner 23, thereby generating an analog reproduced signal. The reproduced signal is supplied to the speaker and headphone jack of the output unit 25. Thus, the data receiver 20 delivers an audio signal at the speaker of the output unit 25.

The controller 26 is formed from a personal computer, for example. The controller 26 has a control program installed therein to acquire music data or the like from the data transmitter 10 via the communications network 30. Executing the control program, the controller 26 controls the MODEM 21, HDD 22, data recombiner 23, reproduction unit 24, and the monitor of the output unit 25. The controller 26 is connected to the control/input unit 27, and performs each of the control functions included in the control program based on a control input signal entered from the keyboard or mouse of the control/input unit 27.

More particularly, the controller 26 controls the MODEM 21 to transmit as a data designation information to the data transmitter 10 an information on a user's desired music data such as genre, player's name, title, etc.

Also, the controller 26 controls the MODEM 21 to transmit a user ID information to the data transmitter 10. More particularly, the user ID information is pre-registered during initial setting of the control program, and the MODEM 21 is controlled to send the data designation and user ID information together as a request information to the data transmitter 10.

After the control program is put into run, the user ID and data name can be supplied to the controller 26 via the monitor of the output unit 25 by operating the keyboard or mouse of the control/input unit 27 in the so-called GUI (Graphical User Interface) mode. The controller 26 will generate a user ID information and data designation information from the supplied user ID and data name, and controls the MODEM 21 to send them together as a request information to the data transmitter 10.

The controller 26 controls the MODEM 21, HDD 22, data recombiner 23 and reproduction unit 24 to effect as in the above the recording into the hard disc, recombination data, and reproduction of the outline and supplement parts transferred in this order from the data transmitter 10. In the data receiver 20, the outline part of the received audio data is real-time delivered at the speaker of the output unit 25, and the audio data can be continuously reproduced. Thus, a music being downloaded can be monitored though the reproduction quality is not so satisfactory.

Suppose that in the data distribution system, when a music data is transferred or distributed from the data transmitter 10 to the data receiver 20. Even if the maximum transfer rate of the communications network 30 is 28.8 kbps for example, the mean transfer rate is 22 kbps and the data transfer rate required for real-time reproduction of a music data (will be referred to simply as "reproduction rate" hereinunder) is 32 kbps and therefore no real-time reproduction is possible in any conventional data distribution system. The data transmitter 10 can divide the music data into an outline part for the low frequency band thereof and supplement part for the high frequency band and transfer the outline and supplement part as thus divided to the data receiver 20, thereby permitting to reproduce the outline part at a rate of 16 kbps. Thus, in the data distribution system 1 according to the present invention, since the transfer rate of the communications network 30 is higher than the reproduction rate for the outline part, the data receiver 20 can reproduce the outline part without any music discontinuity and unsuccessful reproduction which would otherwise take place in the real-time reproduction.

Figure 5:
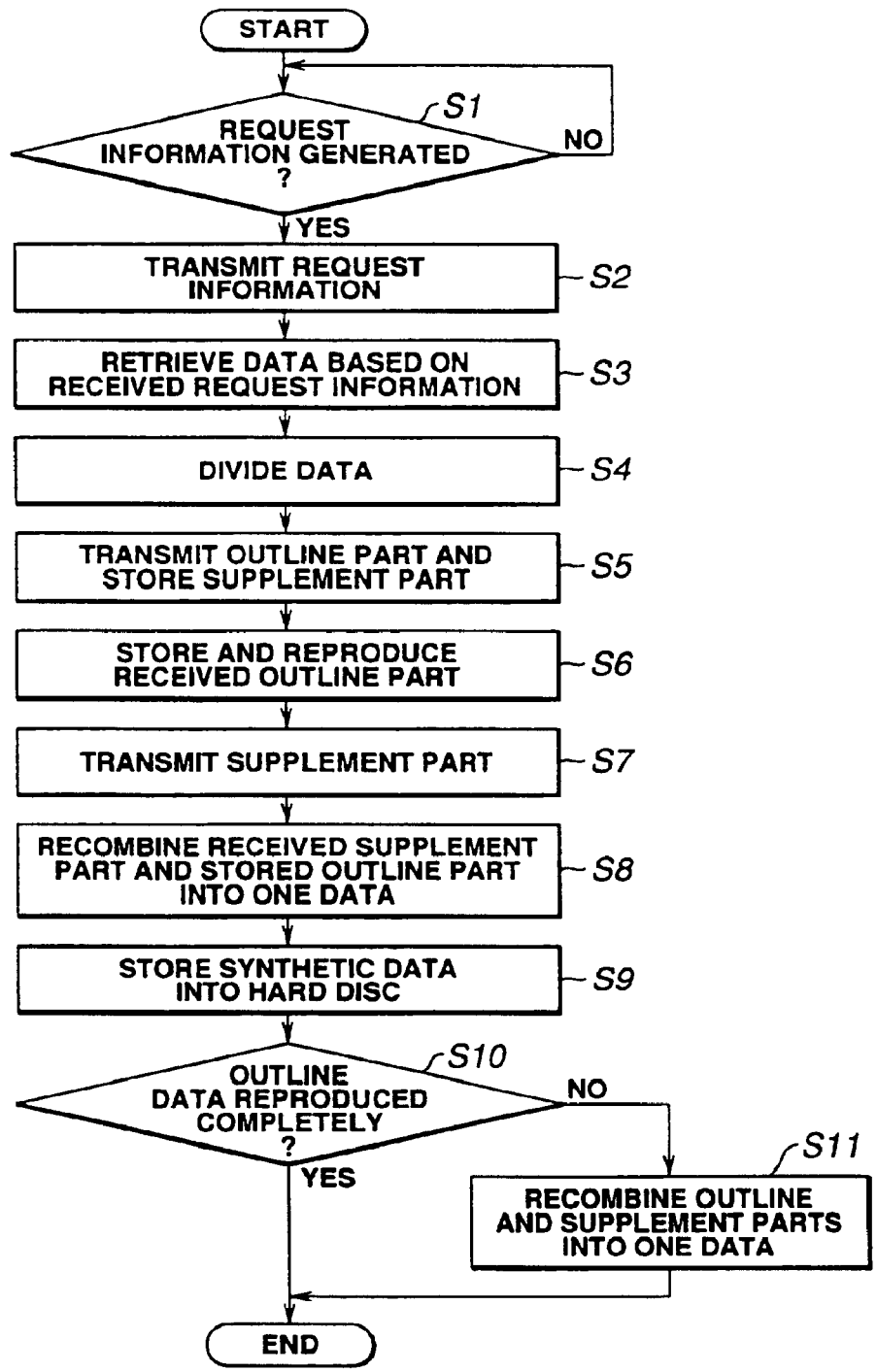
FIG. 5 is a flow chart of the data distribution procedure according to the present invention.

Next, the flow of operations for data communications between the data transmitter 10 and data receiver 20 in the data distribution system 1 of the present invention will be described herebelow with reference to the flow chart in FIG. 5 and time charts shown in FIGS. 6A and 6B.

At Step S1 after the control program is put into run, the controller 26 in the data receiver 20 at the user's side effects such a control that the output unit 25 provides a predetermined display on the monitor thereof. Namely, the data receiver 20 is ready to generate a request information including a data designation and user ID information having previously been mentioned. The user operates the keyboard or mouse to enter a name of his desired music data, thereby designating a genre, player's name and title of the desired data. Thus in the data receiver 20, the controller 26 generates the data co designation information, and a user ID information from the pre-registered user ID. These information are stored once as a request information into the memory (not illustrated) of the controller 26. Upon completion of this storage, the controller 26 will proceed to Step S2.

At Step S2, the controller 26 controls the MODEM 21 to read the above request information from the memory thereof and send it to the data transmitter 10 via the communications network 30.

In the data transmitter 10 at the server's side having received the request information, the controller 15 controls the data retrieval unit 13 to retrieve the desired data from the hard disc array 12 based on the data designation information included in the request information at Step S3. The data retrieval unit 13 reads the data from the hard disc array 12.

At next Step S4, the controller 15 in the data transmitter 10 controls the data divider 14 to divide the data retrieved and read at Step S3 into the outline and supplement parts in any of the modes having been described concerning the first to fourth embodiments. The desired data is thus divided into the outline and supplement parts.

Further at Step S5, the controller 15 in the data transmitter 10 controls the data divider 14 and MODEM 11 to refer to the user ID information and transfer first the outline part resulted from the division of the desired data to the data receiver 20 via the communications network 30 and also to store the supplement part into the memory of the data divider 14.

At the data receiver 20, the controller 26 will control the MODEM 21 to receive the outline part transmitted from the data transmitter 10 via the communications network 30 and store the received outline part into the memory of the data recombiner 23, and also control combiner 23 to output the outline part to the reproduction unit 24 and control the reproduction unit 24 to subject to the predetermined processing the outline part supplied from the data recombiner 23 at Step S6. Thus in the data receiver 20, each of the operations such as reception, reproduction and storage of the outline part will be started at a time to as shown in the time charts in FIGS. 6A and 6B. Note that FIG. 6A shows the operations effected in the data receiver 20 when the actual time for reproduction of the outline part is shorter than that for reception of both the outline and supplement parts, while FIG. 6B shows the operations effected in the data receiver 20 when the actual time for reproduction of the outline part is longer than that for reception of both the outline and supplement parts.

At the data receiver 20, the outline part is supplied as an analog reproduced data to the output unit 25, and an audio data in the middle frequency band will be delivered at the speaker of the output unit 25 as in the above third embodiment.

To reserve the outline part, the controller 26 may have only to control the MODEM 21 and HDD 22 to record the outline part received by the MODEM 21 into the hard disc.

Upon completion of the outline part transmitted at Step S5, the controller 15 in the data transmitter 10 controls the data divider 14 and MODEM 11 to read the supplement part stored in the memory of the data divider 14 and transmit it to the data receiver 20 at Step S7.

Figure 6A:
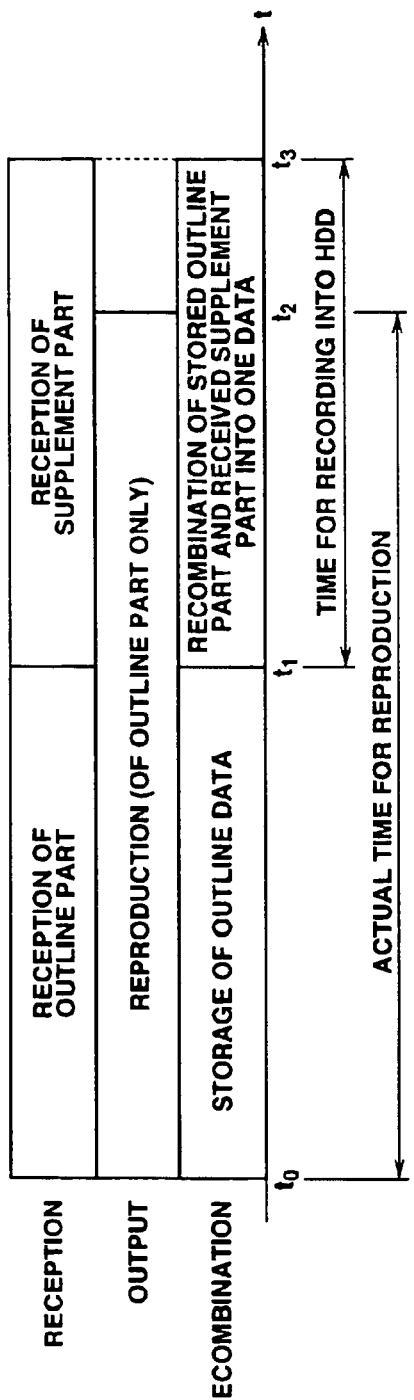
FIG. 6A is a timing chart of the outline part reception, reproduction and recombination according to the present invention.
Figure 6B:
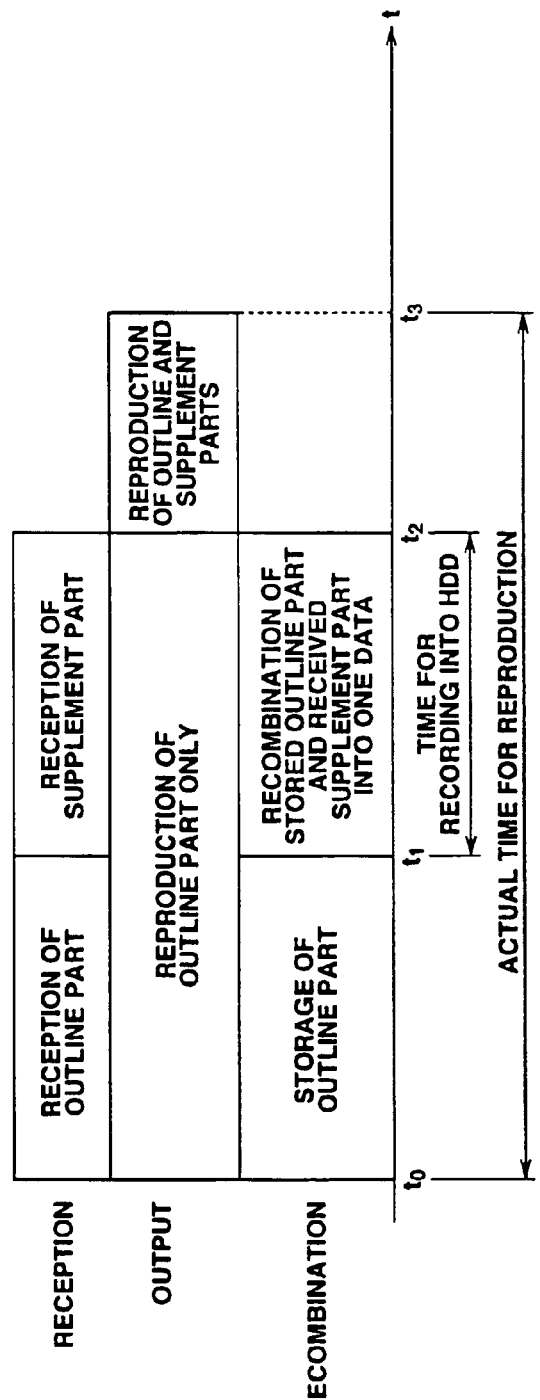
FIG. 6B is also a timing chart of the outline part reception, reproduction and recombination according to the present invention.

Then at the data receiver 20 having received the supplement part, the controller 26 will control the data recombiner 23 to read the outline part from the memory of the data recombiner 23 and recombine the received supplement part and read outline part at a time $t_2$ in FIGS. 6A and 6B into one data at Step S8. Further, the controller 26 will control the data recombiner 23 and HDD 22 to supply the generated composite data to the HDD 22 and record it into the hard disc of the HDD 22 at Step S9. Upon completion of the storage of the composite data into the hard disc, the controller 26 will proceed to a next Step S110.

At Step S10, the controller 26 will judge whether the reproduction of the outline part is completed. When the judgment is YES, namely, when the controller 26 decides that the outline has been reproduced successfully, the controller 26 will terminate the reproduction since the outline part has already been reproduced at a time $t_3$ when the storage of the composite data into the hard disc has completed, as shown in FIG. 6A. On the other hand, when the judgment is NO, namely, when the reproduction of the outline part has not yet been completed, it means that the actual time for reproduction of the outline part has not yet passed at a time $t_2$ when the storage of the composite data into the hard disc is completed, as shown in FIG. 6B. In the latter case, the controller 26 will further proceed to a next Step S11 to have a further higher quality of reproduction.

At Step S11, the controller 26 controls the data recombiner 23 or HDD 22 to recombine the outline and supplement parts for reproduction for a period from the time $t_2$ shown in FIG. 6B to the time $t_3$ at which the time for reproduction of the outline part ends, to thereby assure a so-called high quality of reproduction. For this purpose, the HDD 22 is controlled to reproduce the composite data stored in the hard disc, or the data recombiner 23 is controlled to recombine the supplement part previously stored in the memory of the data recombiner 23 and the outline part into one data which is to be supplied to the reproduction unit 24.

Thus at the data receiver 20, the composite data is supplied as an analog reproduced signal to the output unit 25 and an audio signal restored to the original music data such as a popular music, for example, having the low and high tone bands combined together, is delivered at the speaker of the output unit 25. Then the controller 26 will terminate the above-mentioned series of operations at the time $t_3$ shown in FIG. 6B and at which the high quality reproduction is completed.

As in the foregoing, in the data distribution system 1 according to the present invention, the desired data designated by the user can be divided into the outline and supplement parts, and transferred in that order at a reduced rate. Therefore, the rate of the transfer from the sender to the receiver can be reduced to avoid an interruption or poor quality of the music data reproduced at the receiver, whereby the reliability on the real-time reproduction can be remarkably improved.

Also, in the aforementioned data distribution system 1 according to the present invention, since the data desired and designated by the user is divided into the outline and supplement parts and transferred in that order, a data service system can easily be established in which the outline part may be served to the user free of charge as a sample data, for example, while only the supplement part is served as paid. In this case, the data transmitter 10 transfers the supplement part to the data receiver 20 with a predetermined lock or latch data added to the supplement part to inhibit unauthorized reproduction of the supplement part, the data receiver 20 makes a predetermined billing procedure to the data transmitter 10 to acquire a key data for the lock data from the data transmitter 10, and the data transmitter 10 collates the lock and key data with each other to permit the reproduction of the supplement part only when the lock and key data are judged to correspond to each other.

Note that in the data distribution system 1, since the user at the data receiver 20 can download his desired and requested data into the hard disc through confirmation of the data during reception of the outline part, the user may easily cancel the downloading of the data being made. Therefore, no inconvenience will take place even when the supplement is served to the user as pad.

In the foregoing, the present invention has been described concerning one example of the MOD system configuration. Note however that the present invention is not limited to such MOD system but may of course be applied to a VOD system, a digital data distribution system for serving so-called multimedia information such as still image data, text data, program data, etc., or the like system.

When the present invention is applied in an image data distribution system, for example, the data distribution system 1 according to the present invention may be adapted such that the data divider 14 divides an image data into an outline part and a supplement part by taking an even raster as the outline part and an odd raster as the supplement part. Also, an even frame data may be taken as the outline part while an odd frame data be taken as the supplement part. Otherwise, a data in the low frequency band may be taken as the outline part while a data in the high frequency band be taken as the supplement part. Further, a monochromatic image data may be taken as the outline part while a color picture data be taken as the supplement part.

Furthermore, in the aforementioned data distribution system, the supplement part as a whole is transmitted at a time. However, the present invention is not limited to this embodiment, but the supplement part may be partially transmitted and the transmission of a part of the supplement part be repeated several times until the whole supplement part is transmitted. Namely, in the picture data distribution system described in the foregoing, for example, a picture data is allocated as the outline part while a caption for the picture data is allocated as the supplement part, or vice versa. The outline part may be transferred wholly at a time while the supplement part be divided in several parts for transfer. Alternatively, a low frequency band of a music data played by a musician or artist may be allocated as the outline part, a high frequency band of the music data be allocated as a first supplement part, a picture data of a jacket picture of the artist be allocated as a second supplement part, and a profile information and concert information on the artist be allocated as a third supplement part. Thus a variety of data services can be implemented by the present invention.

In the first embodiment of the present invention, a sum of audio data on the L and R channels is taken as the outline part while a quotient of the audio data on the L channel minus that on the R channel is taken as the supplement part. According to the present invention, however, the quotient of the audio data on the L channel minus that on the R channel may of course be taken as the outline part while the sum of the audio data on the L and R channels be taken as the supplement part.

Furthermore, in the second embodiment, an audio data of even spectrum is taken as the outline part while a one of odd spectrum is taken as the supplement part. However, the audio data of odd spectrum may be taken as the outline part while that of even spectrum be taken as the supplement part.

In the aforementioned fourth embodiment, a vocal audio data is allocated as the outline part while an accompaniment audio data is allocated as the supplement part. However, the accompaniment audio data may be taken as the outline part while the vocal audio data be taken as the supplement part.

The present invention is characterized mainly by the division of a requested data into an outline part and a supplement part at the information service center and earlier transfer of the outline part than the supplement part so that the outline part can be reproduced for monitoring at the terminal equipment at the user's side. Further, the outline part is excellent in that it is not limited only to a part of a music requested for service such as prelude, interlude or postlude and can be reproduced to know the music as a whole but with a low quality.

As having been described in the foregoing, the data distribution system according to the present invention is adapted such that in the data transmitter, a designated data is divided into an outline part and a supplement part by the data dividing means, and the divided outline and supplement parts are transmitted in this order to the data receiver by the data transmitting means, thereby permitting to transfer the data at a considerably low rate. Therefore, the transfer rate cannot be limited and a poor real-time reproduction at the receiver side can be avoided.

The data distribution method according to the present invention is so adapted that a data requested from a user and to be transferred from a data transmitter at the server's side to a data receiver at the user's side is divided into an outline part and a supplement part and the divided outline and supplement parts are transferred in this order, and thus the transfer rate can be considerably be reduced. Therefore, it is possible to avoid a poor real-time reproduction at the data receiver, which would possibly be caused by a limitation to the transfer rate.

Further, the data transmitter according to the present invention is adapted so that the data recombining means delivers to the data reproducing means the outline part supplied from the data communications means and stores it once, recombines the supplement part supplied from the data communications means and the stored outline part into one data, and delivers the composite data thus generated to the data recording means. Thus it is possible to provide the composite data while effecting a real-time reproduction, and record the generated composite data into the data recording means.

Furthermore, the data receiving means according to the present invention is adapted such that the outline part of the requested data for service to the user is received, reproduced and stored once, and then the supplement part of the requested data is received and recombined with the stored outline part into one data which is to be stored into the recording means. Thus, it is possible to provide the composite data thus generated and store the generated composite data into the recording means while effecting a real-time reproduction.

What is claimed is:

1. A data distribution system including an information service center and terminal equipment remote from the information service center and adapted for distributing a program selected at the terminal equipment from the information service center to the terminal equipment, the information service center comprising:

storage means for storing a plurality of programs;

retrieving means for retrieving a desired program selected at the terminal equipment from the plurality of programs stored in the storage means;

dividing means for dividing the desired program retrieved by the retrieving means into an outline part for informing a user of an outline of the desired program and into a supplement part recombinable with the outline part for restoring the desired program, wherein the outline part is of a lower quality than the desired program; and transmission means for transmitting the outline part first followed by the supplement part to the terminal equipment; and the terminal equipment comprising:

receiving means for receiving the outline part first followed by the supplement part of the desired program transmitted from the information service center;

a storage device;

recombining means for recombining the outline part and the supplement part to restore the desired program while the supplement part is being received by the receiving means after the reception of the outline part is completed and for storing the restored program in the storage device while the supplement part is being received; and reproducing means for reproducing the lower quality outline part while the lower quality outline part is being received and for continuing the reproduction of the lower quality outline part while the supplement part is being received until the reproduction of the lower quality outline part is completed, thereby monitoring the desired program while the recombining means restores the desired program.

2. The data distribution system as set forth in claim 1, wherein the desired program includes audio data; and the dividing means comprises:

audio data dividing means for dividing the audio data into a plurality of bands having different respective frequency components; and encoding means for encoding a frequency component of each of the bands resulting from a division of the audio data by the audio data dividing means by allocating a quantization bit to each one of the frequency components for masking a quantum noise, for providing as the outline part an output corresponding to a first band of the plurality of bands, and for providing as the supplement part an output corresponding to a second band of the plurality of bands.

3. The data distribution system as set forth in claim 1, wherein:

the desired program includes audio data; and the dividing means generates a first output through addition of a plurality of channels for the audio data and a second output through subtraction of the plurality of channels, for providing one of the first output and the second output as the outline part and a remaining output as the supplement part.

4. The data distribution system as set forth in claim 1, wherein:

the desired program includes audio data; and the dividing means comprises frequency component dividing means for dividing frequency components of the audio data into an even spectrum and an odd spectrum for providing one of the even spectrum and the odd spectrum as the outline part and an other spectrum as the supplement part.

5. The data distribution system as set forth in claim 1, wherein:

the desired program includes audio data; and the data dividing means divides the audio data into vocal data and accompaniment data for providing one of the vocal data and the accompaniment data as the outline part remaining data as the supplement part.

6. The data distribution system as set forth in claim 1, wherein, when the supplement part from the information service center begins downloading into the terminal equipment, the outline part is continuously reproduced for monitoring by the user.

7. The data distribution system as set forth in claim 1, wherein reproduction of the outline part at the terminal equipment for monitoring is not counted for billing.

8. The data distribution system as set forth in claim 1, wherein the information service center transmits to the terminal equipment the supplement part including additional lock data for a predetermined billing and receives from the terminal equipment key data corresponding to the additional lock data, thereby permitting reproduction of the supplement part at the terminal equipment.

9. A method of distributing a program between an information service center and terminal equipment remote from the information service center, comprising the steps of:

dividing a desired program selected at the terminal equipment into an outline part for informing a user of an outline of the desired program and into a supplement part recombinable with the outline part for restoring the desired program, wherein the outline part is of a lower-quality than the desired program;

transmitting the outline part first followed by the supplement part to the terminal equipment;

receiving at the terminal equipment the outline part first followed by the supplement part of the desired program distributed from the information service center;

recombining the outline part and the supplement part to restore the desired program while the supplement part is being received after the reception of the outline part is completed;

storing the restored program while the supplement part is being received; and reproducing the lower quality outline part while the lower quality outline part is being received and for continuing the reproduction of the lower quality outline part while the supplement part is being received until the reproduction of the lower quality outline part is completed, thereby monitoring the desired program while the desired program is being restored.

* * * * *